May 4, 1937.   N. A. HALLWOOD   2,079,402
WEIGHING APPARATUS FOR MATERIALS UNDERGOING TRANSFERENCE
Filed May 29, 1934    3 Sheets-Sheet 3
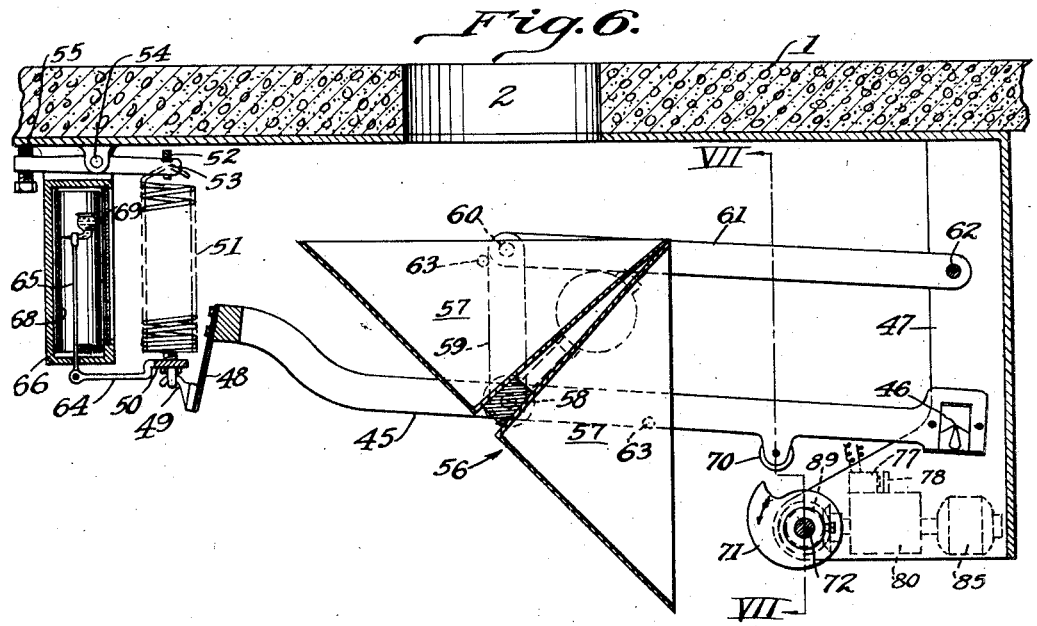
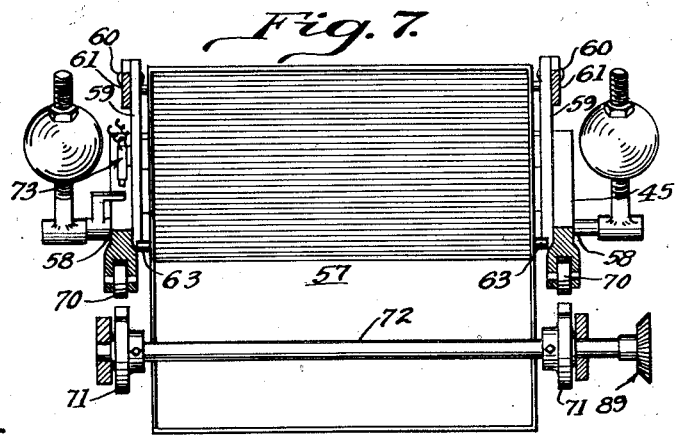
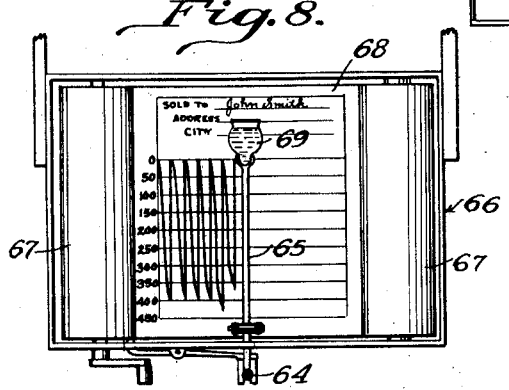
Inventor
Nathan A. Hallwood
By W. S. McDowell
Attorney Patented May 4, 1937

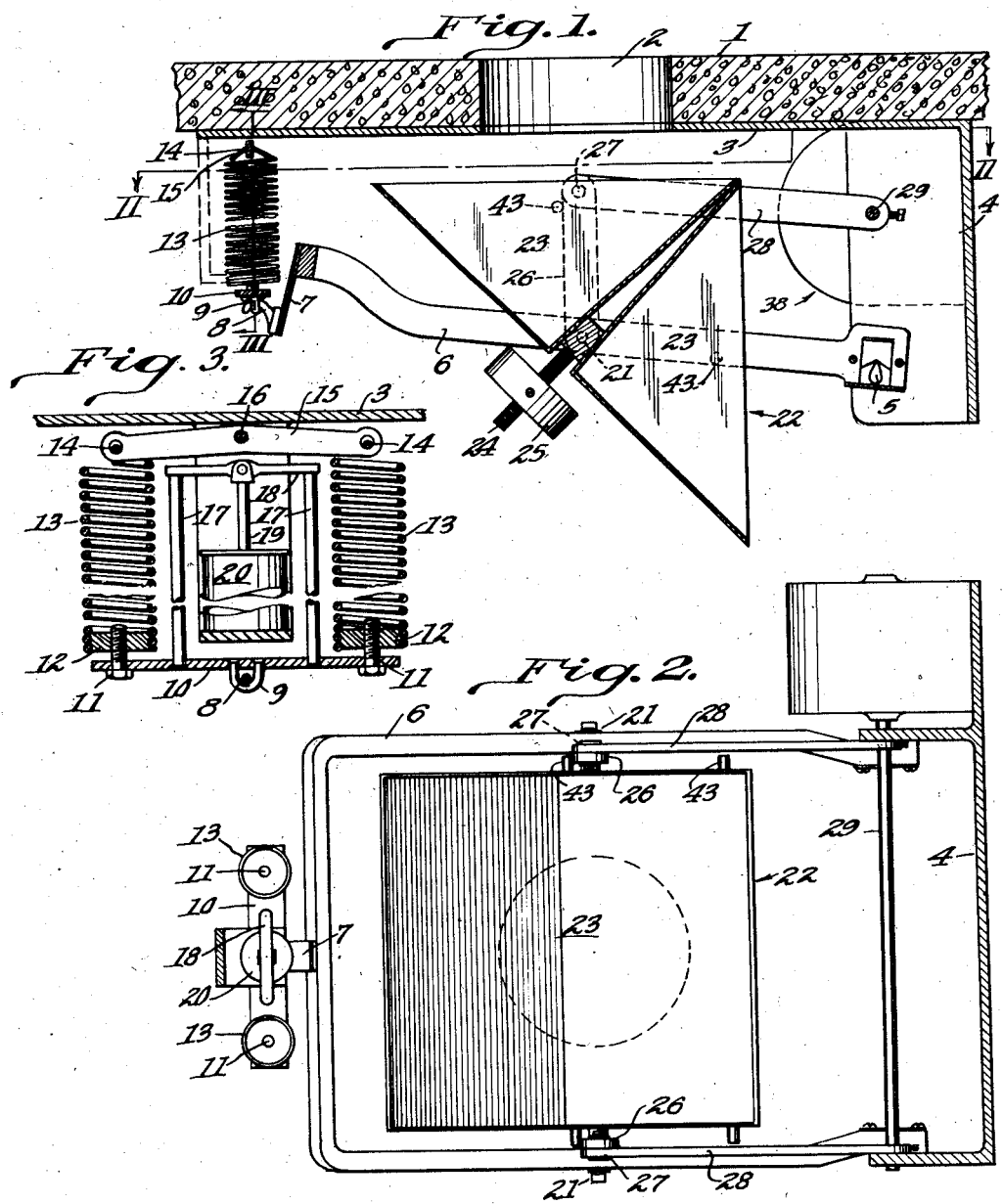

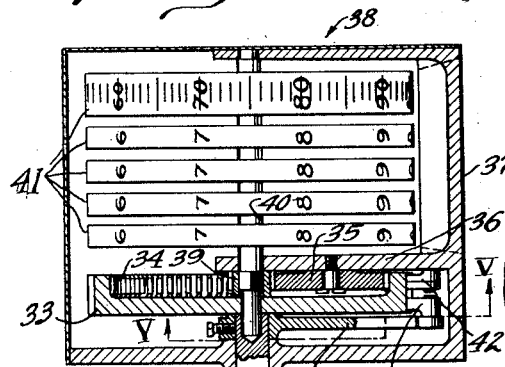
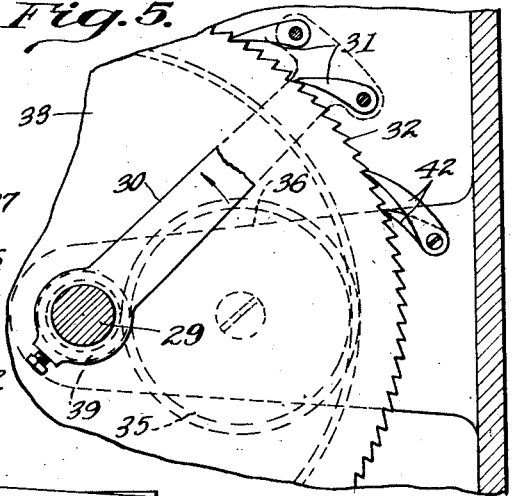
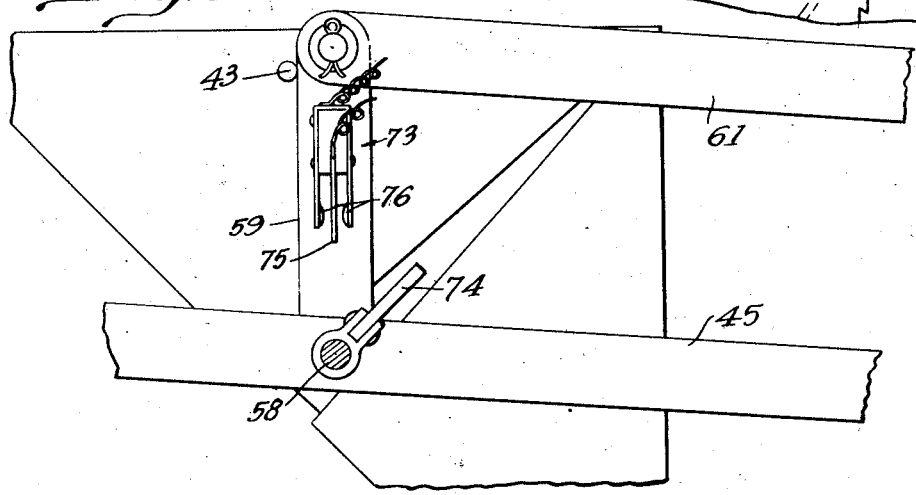
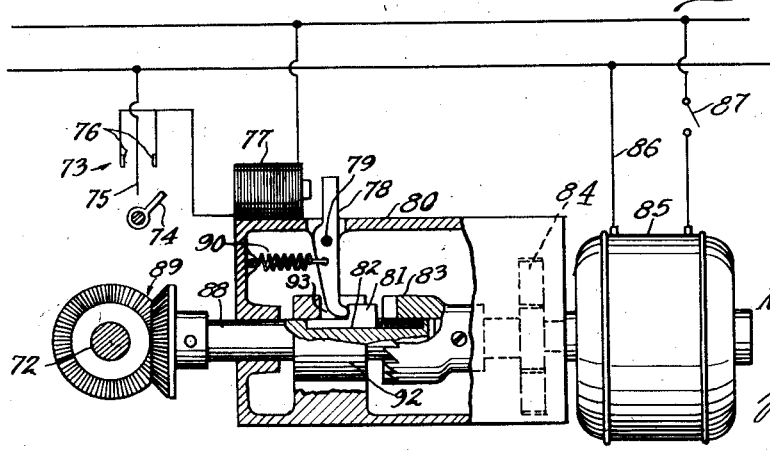

2,079,402

UNITED STATES PATENT OFFICE 2,079,402

WEIGHING APPARATUS FOR MATERIALS UNDERGOING TRANSFERENCE

Nathan A. Hallwood, Columbus, Ohio

Application May 29, 1934, Serial No. 728,144

8 Claims. (Cl. 249—25)

This invention relates to an improved weighing mechanism for accurately indicating, registering or recording the weight of loose bulk materials while the latter are undergoing a stage of transference from one position to another. In certain of its more specific aspects, it is an object of the present invention to provide an improved weighing mechanism to indicate or record the weight of coal while it is being delivered to a storage receptacle or bin. My invention, however, is broadly adapted for the weighing of all kinds of materials and has many industrial applications, such, for instance, as the weighing of ores, sands, clays, cement, flour, liquids and numerous other commodities, while undergoing transference.

In order to weigh such materials during transference thereof from point to point, the present invention provides weighing mechanism wherein is embodied a supporting frame carrying a pivotally mounted beam, supported at one end by means of a suspended spring structure which tends to maintain the beam in a normal or zero position and to resist deflection thereof from said position, the beam being provided, intermediately of the length thereof, with a pivotally mounted commodity receiver having a pair of compartments disposed in offset relationship with respect to the pivotal mounting between the receiver and the beam, the arrangement of said compartments being such that when one thereof has received a given quantity of a material being weighed, the said receiver will become unbalanced and will rotate about its pivotal connection with the beam, thereby discharging the contents of the first compartment and at the same time locating the second compartment so that it will immediately be in position for receiving further quantities of the material undergoing weighing.

A further object of the invention resides in utilizing the movement of the beam when deflected from its normal or zero position for effecting the actuation of associated registering or recording mechanism, in order that the weight of the material handled by the mechanism may be made known and accurately determined by those interested.

It is a further object of the invention to provide mechanism of this character which will function effectively when the materials to be weighed are substantially constantly delivered thereto, so that the operation of the mechanism may be effected rapidly but without loss of accuracy.

For a further understanding of the invention, reference is to be had to the following description and the accompanying drawings in which:

Fig. 1 is a vertical sectional view taken through the weighing apparatus comprising the present invention;

Fig. 2 is a horizontal sectional view on the plane indicated by the line II—II of Fig. 1;

Fig. 3 is a vertical transverse sectional view on the plane indicated by the line III—III of Fig. 1;

Fig. 4 is a detail view of the weight registering mechanism;

Fig. 5 is a vertical sectional view taken through the weight registering mechanism on the plane indicated by the line V—V of Fig. 4;

Fig. 6 is a vertical sectional view of a slightly modified form of my improved weighing apparatus;

Fig. 7 is a vertical transverse sectional view on the plane indicated by the line VII—VII of Fig. 6;

Fig. 8 is a detail view of the weight recording chart employed in connection with the form of apparatus disclosed in Fig. 6;

Fig. 9 is a detail elevational view of the switch mechanism employed for governing the operation of the means for positively returning the weighing beam to normal position;

Fig. 10 is a diagrammatic view of the electrical apparatus and magnetic clutch employed for returning the beam to normal position following successive trippings of the weight receiver.

Referring more particularly to the drawings, the numeral 1 designates a foundation which may comprise a sidewalk, a wall of a building or other unit in which is formed an opening 2 for the passage of loose bulk material, such as coal, from one point to another. In the specific form of the invention illustrated, the foundation 1 comprises a sidewalk in which the opening 2 is formed in order that coal may be transferred from a carrying vehicle to an underground point of storage, and the present invention provides weighing apparatus by which the party purchasing the coal may be informed as to the amount of coal actually delivered. It is manifest, however, that the invention is applicable to the handling and weighing of other materials for different purposes.

In this instance, there is suitably secured to the under side of the foundation 1 a metallic supporting frame or base 3 provided with vertical flanges 4. Secured to the flanges 4 are horizontally aligned knife edge pivots 5 which effect the anti-friction support of the inner end of a beam 6 of rectangular or U-shaped form. Connected with the outer end of the beam 6 is a bi-metal thermostatic strip 7 which carries at its outer and lower end a hook 8, which is received within an eye 9 provided in connection with a bar 10. The outer ends of the bar are equipped with threaded bolts 11 to which are attached adjustable spring securing nuts 12, and coil springs 13 have their lower ends securely attached to the nuts 12. The upper ends of the springs 13 are connected as at 14 with the outer ends of a link 15, the latter being intermediately pivoted as at 16 in connection with the frame 3. When the beam 6 is unweighted or devoid of an applied load, the springs 13 serve to maintain the same in the elevated position disclosed in Fig. 1, which comprises the normal position of the beam. Upon the application of a load to the beam, the latter oscillates about the bearings 5 and is deflected downwardly in a vertical plane against the yielding resistance of the springs 13. The thermostatic strip 7 operates, as usual, to compensate for variations in atmospheric temperature and spring expansion by varying the effective length of the beam. The bar 10 also carries, adjacent to the springs 13, vertical rods 17 which have their upper ends connected with the horizontally disposed yoke 18. From the central portion of this yoke, there depends a rod 19 which is connected with the piston disposed within the cylinder 20 of a one-way dashpot. That is, the dashpot operates in conjunction with the springs 13 to stabilize the operation of the beam upon the application of loads thereto but does not interfere with the rapid return of the beam to a normal position when the same is unweighted.

Pivotally carried by the beam as at 21 is a weight receiver 22, which is adapted for tilting or oscillating movement in connection with the beam. This weight receiver is formed to embody a plurality of compartments 23, the centers of gravity of which being offset with respect to the pivot 21. One or the other of the compartments 23 will be maintained constantly in registration with the opening 2 of the foundation 1 to receive the material undergoing transference and upon which weight determinations are desired. This material will pass through the opening 2 and will be received within one or the other of the compartments 23. When the compartments have been filled to a predetermined degree with this material, the unbalanced or off center positions thereof will cause the weight receiver to rotate bodily about its pivotal axis 21, thereby automatically discharging the contents of a given compartment and allowing the beam and the weight receiver to return immediately to an elevated position under the influence of the coil springs 13. The balance of the weight receiver in discharging its contents may be regulated by the provision of a threaded stem 24 connected with the weight received in alignment with its pivot 21, the stem having mounted thereon an adjustable weight 25. The provision of the weight 25 renders the balance of the weight receiver desirably sensitive so that it will trip when a predetermined load has been applied thereto. Regardless, however, of the tripping of the weight receiver, the present invention provides a means for recording, indicating or registering the amount of material positioned in the weight receivers so that the operation of the weighing apparatus will be accurate irrespective of the tripping action of the weight receiver.

This is attained by providing the beam with a check rod 26 which has its lower end connected with the beam in alignment with the pivot 21. The upper end of the check rod is pivotally connected as at 27 with one end of a check member 28, the opposite end of the check member being fixed to a rotatable shaft 29 journaled in connection with the frame or base 3. It will be understood that the check rod and check member function in the usual manner common to weighing apparatus for rendering the operation of the latter accurate regardless of the position of the applied weight in or on the weight receiver. The rotation of the shaft 29, in response to the deflection of the beam 6 from normal, oscillates a crank arm 30 with which are connected pivoted pawls 31 disposed for engagement with ratchet teeth 32 of a weight indicator wheel 33. It will be understood that the throw of the crank arm is proportional to the deflection of the beam so that the weight indicator wheel will be revolved to properly indicate or record the weight of the material handled by the apparatus.

The wheel 33 has its rim formed with internal gear teeth 34, which mesh with an idler 35 mounted on a bracket arm 36 formed in connection with a casing 37 of a weight register 38. The idler drives a pinion 39 which rotates the axially disposed counter-shaft 40 which is journaled within the casing 37 and carries the usual odometer counter-wheels 41, the numerals on which are viewable through an opening in the wall of the casing 37. Detents 42 are carried by the bracket arm 36 and engage with the teeth of the wheel 33 to prevent backward movement thereof. The wheels 41 are of the usual type wherein one wheel is compelled to make a full revolution to partially rotate the next adjacent wheel through a predetermined increment of travel.

To govern the extent of oscillation of the weight receiver, the latter may be provided with pins or other equivalent stop devices 43, which are adapted to alternately contact with the check rod 26, thereby limiting the tripping movement of the receiver so that one of its compartments may be maintained constantly in registration with the material receiving opening formed in the foundation 1.

In the form of my invention illustrated in Figs. 6 to 10, the weighing beam is designated at 45 and is fulcrumed as at 46 in connection with a suitable supporting frame 47. The outer end of the beam 45 is provided with the thermostatic strip 48 and hook 49, which is connected with a transverse bar 50 with which is joined the lower ends of coil springs 51. The upper ends of the springs are connected with a cross bar 52 supported in connection with a lever 53 pivoted as at 54 in connection with the frame 47. One end of the lever 53 is provided with a set screw 55 by means of which the tension of the springs 51 may be adjusted to maintain the beam in its desired normal position.

The beam 45 is provided with the weight receiver 56 formed with the spaced compartments 57 and pivotally mounted as at 58 in connection with the intermediate portion of the beam. Also pivotally mounted as at 58 in connection with the beam are the lower ends of check rods 59, which have their upper ends pivotally connected as at 60 with check links 61, the other ends of the latter being pivotally supported by a rod 62 carried by the frame 47. The weight receiver is provided with the stationary stops 63 which engage with the check link 61 to limit the extent of oscillation of the weight receiver when the latter trips to discharge its contents and to insure equal deflection of both hoppers for a given load.

In this form of my invention, the bar 50 is provided with an arm 64 with which is connected the lower end of a stylus 65 mounted for vertical movement in a recorder casing 66. In this recorder casing, there is arranged, as disclosed in Fig. 8, a pair of vertical rolls 67, one of which may be driven or positively rotated by a spring motor mechanism, not shown. The rolls 67 carry a strip of paper or the like 68 which slowly but constantly moves, when the recorder is in operation, from one roll to the other. On the strip 68 there is printed or otherwise disposed data with respect to material weights, such for instance as pound markings. The upper end of the stylus 65 carries the writing instrument 69, the point of which is maintained in constant engagement with one surface of the strip 68. By this arrangement, when the beam 45 is deflected from zero or its normal position, corresponding movement will be imparted to the writing instrument 69, causing the latter to produce a record on the sheet or strip 68 of the amount of material weighed by the apparatus.

Another feature of this form of my invention resides in the provision of positive means for returning the scale beam to its zero position after each successive tripping operation of the weight receiver. While the springs 51 and the one-way dashpot allow for rapid return of the beam toward normal position following a given tripping of the weight receiver, yet if materials being weighed are being passed with rapidity through the opening 2 toward the weight receiver, it may occur that after the tripping of one compartment, a sufficient amount of material will be deposited in the other compartment to prevent the complete return of the beam to normal. With the use of recording apparatus of the type disclosed in Figs. 6 and 8, it is important that the beam should return positively to its zero or normal position for record producing purposes. I attain this result by providing the under side of the beam 45, between the pivotal point of the weight receiver and the fulcrum 46, with a roller 70. This roller is arranged in the path of movement of the peripheral portion of a cam 71, which is carried by a shaft 72 journaled in connection with the frame 47. The contour of the cam 71 is such that the roller 70 will not engage therewith during normal downward movement of the beam in response to applied weights, but when the cam is rotated, by automatic means operative following tripping of the weight receiver, its peripheral portion will engage with the roller 70 to positively oscillate the beam in an upward direction until its normal position is obtained.

The automatic means for governing the operation of the cam 71 has been illustrated in the accompanying drawings as comprising a switch 73 mounted in connection with one of the check rods 59. The oscillating shaft 58 of the weight receiver is equipped with a crank arm 74 as disclosed in Fig. 9. The path of movement of the outer end of the crank arm is such that it will intersect the lower end of a flexible switch arm 75, causing positive flexure of the latter to a point sufficient to effect its momentary engagement with one or the other of a pair of stationary contacts 76, constituting a part of the switch 73. The contacting of the switch arm 75 with one or the other of the contacts 76, energizes a solenoid 77 which oscillates an armature 78 pivotally mounted as at 79 in a magnetic clutch casing 80. The lower end of the armature 78 engages with a sliding key 81 constituting a part of a sliding clutch member 82, which is normally spaced from the teeth of a constantly driven rotating clutch member 83. The member 83 is driven through means of suitable speed reducing gearing 84 by a constantly operating electric motor 85 disposed in an electrical circuit 86 in which is arranged a hand operated switch 87. The rotation of the clutch member 82 drives a shaft 88 which through direct gearing 89 revolves a shaft on which the cam 71 is mounted. By this arrangement, whenever the weight receiver oscillates to automatically trip its load, the switch 73 is momentarily closed by the wiping engagement of the arms 74 and 75. This momentarily energizes the solenoid 77, which moves the pivoted armature 78 against the resistance of the spring 90 associated therewith. The oscillation of the armature 78 forces the key of the clutch member 82 into driving contact with the teeth of the constantly driven clutch member 83, this being effected against the resistance offered by the spring 90. The clutch member 82 is constantly held in driving relation with the clutch member 83 for one complete cycle of rotation of 360° by the engagement of the clutch member 82 with the stationary bearing 92 of the casing 80, this being necessary since the armature 78 is but momentarily energized and is quickly retracted by its spring 90. When the clutch member 82 rotates through its full cycle of movement, the spring 90 thereof declutches said clutch member by allowing the clutch member 82 to be forced backwardly in a recess 93 formed in the bearing 92 and into normal contact with the lower end of the armature.

In view of the foregoing, it will be seen that the present invention provides a means for weighing and automatically recording or registering the weight of loose bulk materials while the latter are falling by gravity from an upper discharge level to a lower receiving level. The apparatus is particularly useful by large users of coal, such as public buildings, manufacturing plants and the like, for the purpose of determining and checking the weights of coal received from dealers at the time of its delivery. So far as I am aware, no weighing apparatus is provided at the present time for meeting this commercial need in a simple, practical way without interfering with the speed of coal delivery or transference. The present invention therefore provides a means whereby the buyers of coal will be assured of the accuracy of the weight and the quantity of the coal actually delivered. It will be understood, however, that the invention is applicable to many other industrial applications wherein material undergoing transference is required to be weighed in a substantially continuous and automatic manner. The stop pins 43 engage with the check rod devices not only for the purpose of limiting the oscillation of the weight received but also for the added purpose of enabling the check rod mechanism to function in the usual capacity of such mechanism in permitting materials to be weighed to be placed at any desired position on the weight receiver with respect to its pivotal axis.

What is claimed is:

1. In weighing apparatus, a pivotally supported beam, resistance means for yieldably resisting deflective movement of said beam from a normal position, a self-discharging receiver pivotally supported by said beam at a position intermediate of the length of the latter, and means actuated by the movement of said weight receiver for positively restoring said beam to its normal position after each operation of said weight receiver to discharge material therefrom.

2. In weighing apparatus, a pivotally supported beam, resistance means for yieldably resisting deflective movement of said beam from a normal position, a self-discharging receiver pivotally supported by said beam at a position intermediate of the length of the latter, means actuated by the movement of said weight receiver for positively restoring said beam to its normal position after each operation of said weight receiver to discharge material therefrom, and means actuated by the movement of said beam for disclosing the weight of the materials introduced into said weight receiver.

3. In a weighing mechanism, a pivotally mounted beam, spring means yieldably resisting deflective movement of said beam from a normal position, a self-discharging weight receiver pivotally supported by said beam intermediately of the length of the latter, and means for positively restoring said beam to a normal position upon discharge of materials from said weight receiver.

4. In a weighing mechanism of the character described, a support, a beam pivoted at one end to said support, spring means arranged at the opposite end of said beam to yieldably resist deflective movement thereof from a normal position, a self-discharging weight receiver pivotally carried by the intermediate portion of said beam, said weight receiver including a pair of V-shaped hoppers mounted in offset relation to the pivotal mounting of said weight receiver, and check means cooperating with said beam and weight receiver to hold one of said hoppers in a load receiving position at all times.

5. In a weighing mechanism of the character set forth, a support, a beam pivotally mounted at one of its ends on said support, spring means connecting the opposite end of the beam to said support and serving to yieldably resist deflective movement thereof from a normal position, a self discharging weight receiver pivotally carried by the intermediate portion of said beam, said weight receiver including a pair of hoppers so mounted with relation to the pivotal mounting of said weight receivers that a predetermined load in the hopper in a material receiving position will cause it to tip to discharge its contents and to position the other hopper in the receiving position, and means provided in connection with said weight receiver to vary the tipping moment thereof.

6. In a weighing mechanism of the character described, a support, a beam pivotally mounted at one of its ends on said support, spring means arranged to yieldably resist deflective movement of said beam from a normal position, a weight receiver pivotally supported by the intermediate portion of said beam, said weight receiver comprising a pair of hoppers mounted in offset relation with respect to the pivotal mounting of said weight receiver, a check link mechanism connected to said beam and support, means provided on said hoppers for engaging said check link mechanism to maintain one of said hoppers in a material receiving position at all times and a recording mechanism connected to said check link mechanism and serving to indicate the deflective movement of said beam.

7. Apparatus for weighing loose bulk materials during transference thereof, comprising a pivotally supported beam, means for yieldably resisting deflective movement of said beam in direct proportion to the load applied thereto, means to disclose deflective movement of said beam from its normal position, a self-discharging receiver for the materials being weighed pivotally supported by said beam, said receiver being formed with at least a pair of compartments disposed in offset relation to the pivotal axis of the weight receiver on said beam, check means carried by said beam, and stop means engaging said check means to position each of the compartments of said weight receiver to receive the materials being weighed.

8. In weighing mechanism of the character set forth, a beam pivotally mounted at one end, spring means connected with the other end of said beam and serving to resist deflective movement of the beam from a given normal position thereof, a one-way dash pot cooperative with said beam, a weight receiver pivotally supported by said beam intermediately of the length thereof, check rod mechanism pivotally connected with the beam at the point of connection of the weight receiver, stop members provided upon said weight receiver and engaging said check rod mechanism to limit pivotal movement of said weight receiver, means for effecting positive discharge of the contents of the weight receiver when the latter has been filled to a predetermined degree with the materials undergoing weighing, and accumulative weight recording mechanism automatically actuated by the movements of said beam from its normal position.

NATHAN A. HALLWOOD.